(12) United States Patent
Moretti et al.

(10) Patent No.: US 7,382,780 B1
(45) Date of Patent: Jun. 3, 2008

(54) METHOD FOR TIME CODING OF ASYNCHRONOUS DATA TRANSMISSIONS

(75) Inventors: David J. Moretti, Wakefield, RI (US); John A. Fitzgerald, Bristol, RI (US); Daniel Dufresne, Somerset, MA (US); Ramon A. Garcia, Saunderstown, RI (US)

(73) Assignee: The United States of America represented by the Secretary of the Navy., Washington, DC (US)

( * ) Notice: Subject to any disclaimer, the term of this patent is extended or adjusted under 35 U.S.C. 154(b) by 660 days.

(21) Appl. No.: 11/101,115

(22) Filed: Apr. 4, 2005

(51) Int. Cl.
*H04L 12/28* (2006.01)
*H04L 12/56* (2006.01)

(52) U.S. Cl. .................. 370/395.1; 370/473; 370/474; 370/503

(58) Field of Classification Search ................ 370/300, 370/394, 473, 509, 512, 514, 503, 474, 395.1
See application file for complete search history.

(56) References Cited

U.S. PATENT DOCUMENTS

| | | | | |
|---|---|---|---|---|
| 3,665,417 A | * | 5/1972 | Low et al. .................. | 713/502 |
| 5,097,490 A | * | 3/1992 | Hulsing et al. ................ | 377/28 |
| 5,396,492 A | * | 3/1995 | Lien ............................ | 370/412 |
| 5,715,285 A | * | 2/1998 | Yamada ....................... | 375/376 |
| 5,896,388 A | * | 4/1999 | Earnest ..................... | 370/230.1 |
| 6,098,178 A | * | 8/2000 | Moretti et al. .............. | 713/500 |
| 6,400,733 B1 | * | 6/2002 | Gloudemans et al. ........ | 370/509 |

\* cited by examiner

*Primary Examiner*—Lun-Yi Lao
*Assistant Examiner*—Aamer Zain
(74) *Attorney, Agent, or Firm*—James M. Kasischke; Michael P. Stanley; Jean-Paul A. Nasser

(57) ABSTRACT

A method of transmitting data includes synchronizing a system clock with a real time clock. Digital data is collected from multiple sources at a system clock time. A sample counter provides a count for each system clock time. The digital data for each source is associated with the count. A data cell is composed from the digital data associated with at least one count and a source identifier. A data frame is created from the data cells from every source. A cell frame is created from a plurality of data frames, and a time frame is composed from a plurality of cell frames. A heads-up cell including the count is transmitted before the time frame. A time/count cell including the count and the real time is transmitted with the associated time frame.

8 Claims, 3 Drawing Sheets

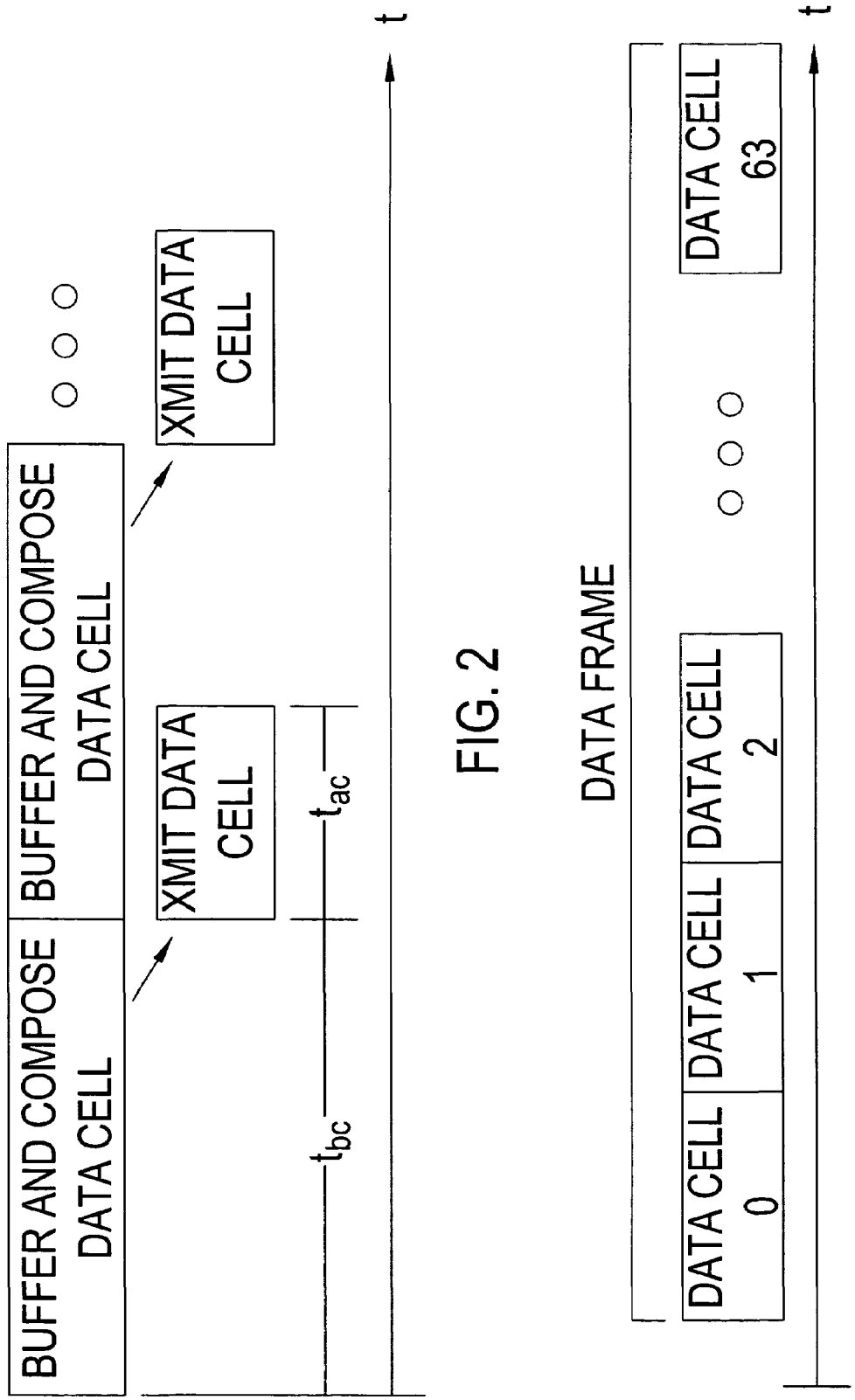

METHOD FOR TIME CODING OF ASYNCHRONOUS DATA TRANSMISSIONS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

This invention relates to a method for putting a time code in asynchronously transmitted data. More specifically the invention relates to a method for providing a time code for multiple streams of simultaneously received data in order to allow reconstruction of the data after asynchronous transfer.

(2) Description of the Prior Art

It is often desirable to transmit data collected from a plurality of sensors. When the data is received, it is desirable that the original signal be reconstructed to have the same timing as the originally received data. Asynchronous transfer mode (ATM) utilizes a shared, high bandwidth transmission line. In ATM, data is packaged into 53 Byte cells having a 5 Byte header and a 48 Byte data region. When data is transmitted via ATM, other data is inserted in the transmission stream and the timing of the transmitted data is not preserved. Additionally, data cells can be lost during transmission. If detected, various well known error correction techniques can be applied to make up for the lost data.

The prior art discloses numerous means for capturing the time that a single data stream is received. Typically, these methods involve adding a time stamp to each cell transmitted over an ATM network. These methods do not allow time reconstruction of data received simultaneously from a plurality of data sources because they do not include a means for synchronizing data among the sources to indicate both the time received and the source.

SUMMARY OF THE INVENTION

This invention provides a method of transmitting data of an asynchronous transfer mode network and reconstructing the data on receipt. The method includes synchronizing a system clock with a real time clock. Digital data is collected from multiple sources at a system clock time. A sample counter provides a count for each system clock time. The digital data for each source is associated with the count. A data cell is composed from the digital data associated with at least one count and a source identifier. A data frame is created from the data cells from every source. A cell frame is created from a plurality of data frames, and a time frame is composed from a plurality of cell frames. A heads-up cell including the count is transmitted before the time frame. A time/count cell including the count and the real time is transmitted with the associated time frame.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein:

FIG. 2 is a timing diagram showing receipt of the data and transmission of the data;

FIG. 3A is a diagram showing composition of a data frame;

DESCRIPTION OF THE PREFERRED EMBODIMENT

Figure 1:
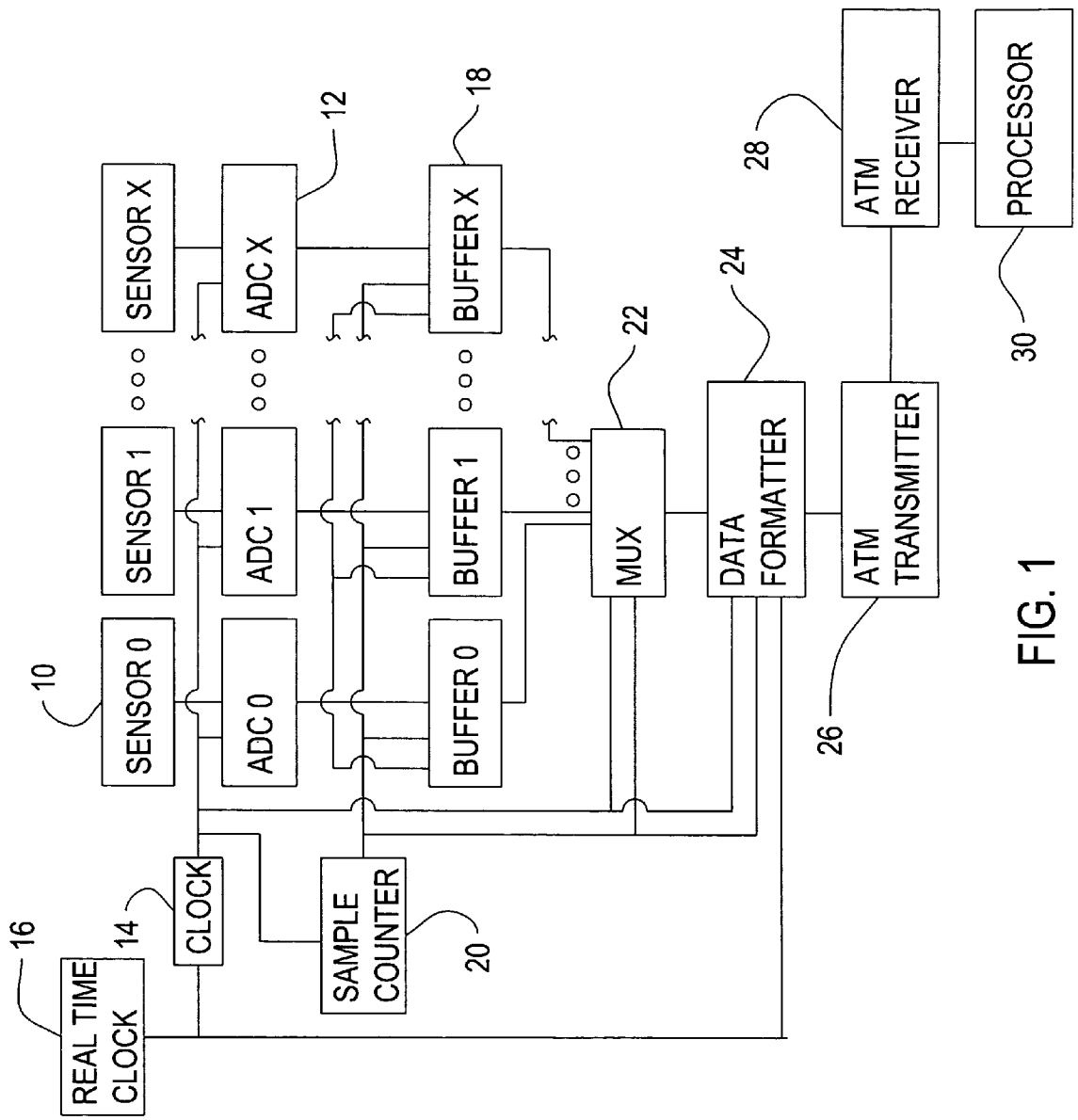
FIG. 1 is a diagram of a generic system providing the data stream.

FIG. 1 shows a generic system capable of organizing data by the method of this invention. Data is received from a plurality of sensors 10 labeled sensor 0 through sensor X. Analog to digital converters (ADC) 12 are labeled ADC 0 through ADC X with each ADC 12 being joined to a corresponding sensor 10. A clock 14 is joined to provide a system clock signal to each ADC 12. Clock 14 is synchronized with a real time clock 16 so that the system clock signal corresponds with an exact start time. Real time clock 16 can be any highly accurate clock such as a quartz clock synchronized by receipt of a GPS signal or an atomic clock. Each ADC 12 is joined to an associated buffer 18 identified as buffer 0 through buffer X. In an alternative embodiment, the ADCs can be internally buffered. Clock 14 is also joined to a sample counter 20 to count the samples. Sample counter 20 provides a full count, t_count, indicating the number of samples received. The least significant bits of this counter provides a partial count, c_count, which is used to align sets of data received at the same time. Sample counter 20 can be joined to real time clock 16 to be reset at a certain time. In the alternative, sample counter could roll over, reset after a certain number of samples, or be reset on command. Counter 20 is joined to buffers 18 to associate the lower bits of the count, c_count, with the sample. Buffers 18 provide the associated sample data and count as output data to multiplexer 22 to change the data from parallel data to sequential data. The multiplexer 22 must be clocked at a faster rate than buffers 16 in order to sequence the data before the next sample arrives. Multiplexer 22 is joined to a data formatter 24. Data formatter 24 breaks sequential data from multiplexer 22 into data cells and inserts the proper timing information in accordance with this invention. In the alternative embodiment having internally buffered ADCs, the count from sample counter 20 can be associated with the data at any time before formatting. Data formatter is joined to an asynchronous transfer mode (ATM) transmitter 26 for sending the data via ATM. An ATM receiver 28 is positioned to receive the data. The received data can then be transferred to a processor 30 for reconstructing the digitized data.

This is only a generic system for practicing this method. ADCs 12 can have different internal functions and some may be capable of providing a sample count or of buffering the sample. The system could be reconfigured by having buffers 16 being capable of handling data from more than one ADC 12. The sample count can be added to the data at a different location than in the buffer. The multiplexer can have different numbers of channels and can be joined to other multiplexers to obtain the required number of channels.

According to the method of this invention, sensors 10 receive analog data. This analog data is then converted into digital data by at least one ADC 12. In the preferred embodiment, the data is sampled at a rate of approximately 104.4 KHz. This digital data is associated with a sensor identifier during processing. At a predefined interval, a system clock 14 is synchronized with a real time clock 16 to provide a system clock time. The system clock time is provided to each ADC 12 to trigger the ADC and collect the data at the trigger time. The system clock time is also provided to sample counter 20 having a full count, t_count, and a partial count, c_count. In a preferred embodiment, the partial count is the least significant portion of the full count. The sample counter 20 provides a count for each system clock time. The digital data from each ADC 12 is associated with the particular partial count associated with that system clock time. In the preferred embodiment sixty-four channels of data are utilized. This can correspond to sixty-four sensors and ADCs. A data cell is composed by data formatter 24 from the digital data associated with the partial count and the sensor identifier. In the preferred embodiment this data cell is a standard ATM cell having 53 Bytes. The standard ATM cell includes 5 Bytes of header information that tells where the package should be directed and 48 Bytes of data. This data cell can have twenty four samples in the preferred embodiment.

FIG. 2 shows a timing diagram concerning data collection and transmission. The time, $t_{bc}$, for buffering and collecting data to compose one data cell is equal to the number of samples per data cell divided by the sampling rate. In the preferred embodiment, $t_{bc}$=229.8 μSec and, at a SONET OC-3 transfer rate of 155.55 MHz, a data cell can be transferred in $t_{ac}$=2.72630 μsec. As can be seen from FIG. 2, data is composed and buffered while data from previous time periods is being sent.

Figure 3B:
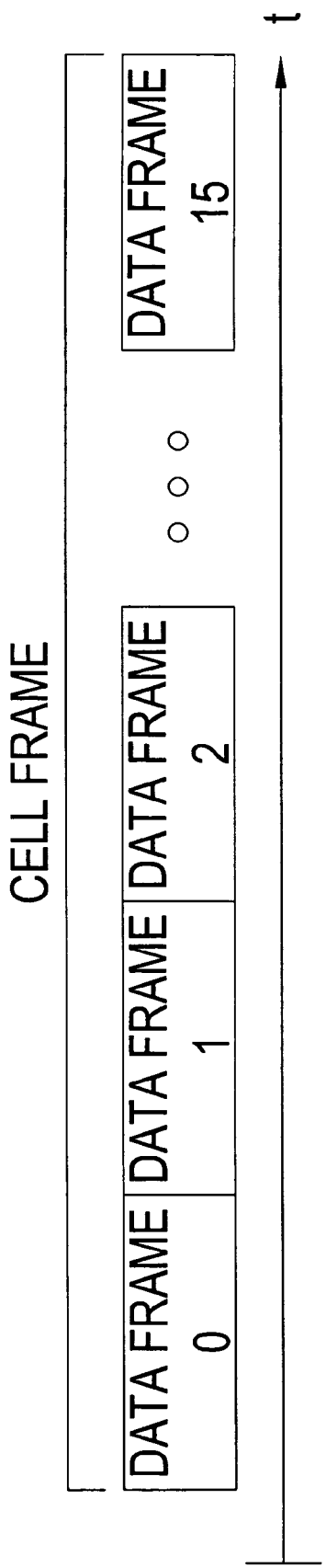
FIG. 3B is a diagram showing composition of a cell frame.

At a particular partial count, a data frame is created from the composed data cells from all of the sensors. FIG. 3A shows the composition of the data frame. The transfer time, $t_{df}$, for the entire data frame is the number of channels multiplied by the time for transfer of a single cell, $t_{ac}$. Thus, in the preferred embodiment having sixty-four channels, $t_{df}$=174.48 μsec. A cell frame, FIG. 3B, is composed by the data formatter from a plurality of data frames associated with a revolution of the partial count. For example, in the preferred embodiment, the lowest four bits of the counter are used to count from zero to fifteen before returning to zero. The time for transfer of a cell frame, $t_{cell}$, is limited by the time required for buffering and composing, $t_{bc}$, and the amount of data to be transferred in the data frame. As utilized in this embodiment, a cell frame can be transferred in 3.6768 mSec.

Figure 4:
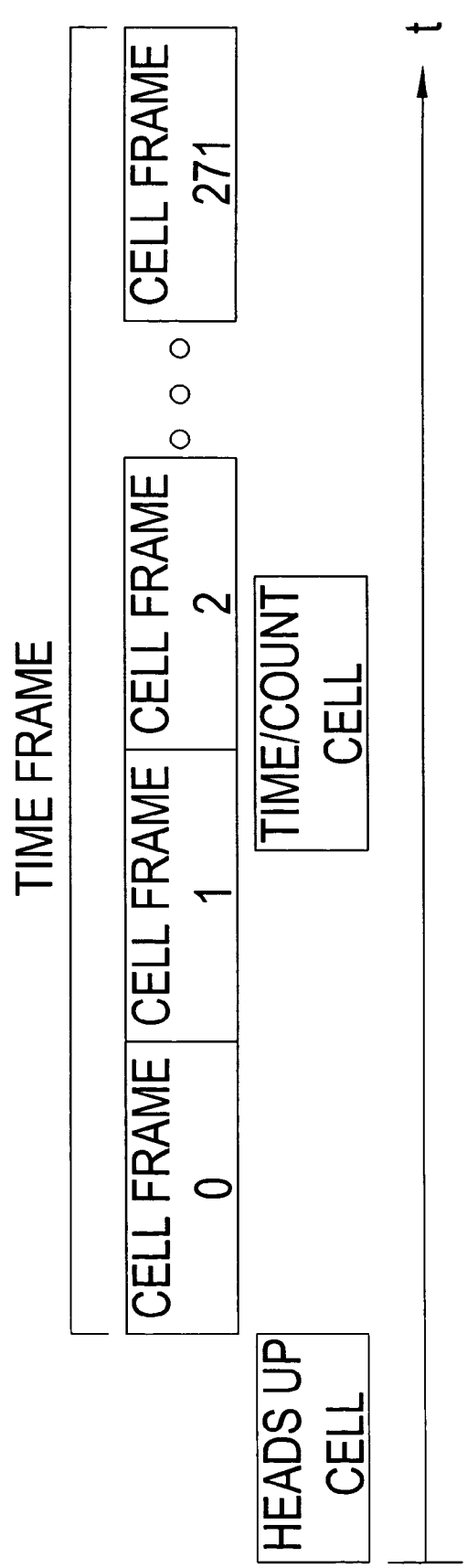
FIG. 4 is a diagram showing composition and transmission of a time frame with timing related cells.

A time frame can be composed from a predetermined number of cell frames fitting into a time period. FIG. 4 shows a timing diagram of the time frame and associated transmissions. In the preferred embodiment, a one second time period is used. There 271 cell frames needed to fill this time period.

A heads up cell is inserted into the data stream before the associated time frame. The heads up cell contains the full count of the sample counter. The heads up cell is transmitted after the last data cell of the previous time frame and before the first cell of the next time frame. Thus, the heads up cell fits into the time in the previous cell frame ($t_{bc}$-$t_{df}$) that is not occupied by actual data. This cell acts to alert the receiving system that a new time frame has begun and a new time/count cell will be arriving.

A time/count cell is composed from the full count, t_count, of the sample counter 20 and the real time from the real time clock 16 associated with the first system clock time in the time frame. The data cells in the time frame are transmitted immediately after transmitting the heads up cell. The composed time/count cell is transmitted between cell frames within an associated time frame. Preferably, the time/count cell is transmitted before the fourth cell frame to reduce data buffering. The time/count cell can be transferred within the current time frame without interference because only a portion of the cell frame is filled with actual data.

A standard Asynchronous Transfer Mode (ATM) receiver is used to receive the data stream. The data can be processed as it is received or it can be held for processing at a later time. One possible reconstruction algorithm is provided to receive the ATM data stream as follows. The received cell is analyzed to determine if it is a heads up cell. If a heads up cell is not received, the algorithm continues receiving data until a heads up cell is received because this algorithm must begin with a heads up cell. Once a heads up cell is received the heads up cell info is used to initialize a counter. The algorithm then proceeds to receive additional data until a Time Count cell is received. Prior to the receipt of the time count cell, the received data is associated with a count based on the count from the heads up cell and held in a buffer or other temporary storage means. When the time count cell is received the heads up cell count is confirmed, and the real clock time value and counter value is translated to actual time. The data held in the buffer is processed by associating it with the actual time. During this processing dropped ATM cells can be skipped or otherwise accounted for. Utilizing the sensor identifier, the data associated with the actual time is saved in the preferred format for recreating the sensor input. Data is received, associated with the actual time and saved until another heads up cell is received. Other reconstruction algorithms may have the capability of buffering the data received before the heads up cell and recreating time and count data from the next heads up cell.

The apparatus cited in FIG. 1 represents only one possible apparatus that can be used for providing a data stream arranged by the inventive method, and this invention should not be limited by application to any specific apparatus. Likewise the reconstruction algorithm merely represents one possible reconstruction algorithm and incorporation herein should not be construed as a limitation of the invention.

What is claimed is:

1. A method of transmitting data comprising:

synchronizing a system clock with a real time clock to provide a system clock time;

collecting digital data from a plurality of sources at a known system clock time, each source being identified with a source identifier;

providing the system clock time to a sample counter having a full count and a partial count, the partial count being the least significant portion of the full count, and the sample counter providing a count for each system clock time;

associating the digital data for each source with each count of the partial count at the system clock time;

composing a data cell from the digital data associated with at least one count of the partial count and the source identifier;

composing a data frame from the composed data cells from all of the sources;

composing a cell frame from a plurality of data frames, each cell frame being associated with a revolution of the partial count;

composing a time frame as a predetermined number of cell frames;

composing a heads up cell from the full count of the sample counter;

composing a time/count cell from the full count of the sample counter and a synchronized real time from the real time clock;

transmitting the heads up cell before transmitting each composed time frame;

transmitting the composed time frame; and transmitting the time/count cell between cell frames within an associated time frame, said transmitted heads up cells, composed time frames and time/count cells being collectively identified as an asynchronous data stream.

2. The method of claim 1 further comprising the step of receiving the asynchronous data stream.

3. The method of claim 2 further comprising the step of reconstructing digital data for each source from the received asynchronous data stream.

4. The method of claim 2 further comprising the step of performing an error check on the asynchronous data stream by ensuring that digital data was received from each source at each system clock time by using the partial count from the composed data cell.

5. A method of transmitting data comprising:

collecting analog data from a plurality of sensors, each sensor being identified with a sensor identifier;

synchronizing a system clock with a real time clock to provide a system clock time;

providing the system clock time to a sample counter having a full count and a partial count, the partial count being the least significant portion of the full count, and the sample counter providing a count for each system clock time;

converting the analog data to digital data for each sensor at each system clock time;

associating the digital data for each sensor with each count of the partial count at the system clock time;

composing a data cell from the digital data associated with at least one count of the partial count and the sensor identifier;

composing a data frame from the composed data cells from all of the sensors;

composing a cell frame from a plurality of data frames, each cell frame being associated with a revolution of the partial count;

composing a time frame as a predetermined number of cell frames;

composing a heads up cell from the full count of the sample counter;

composing a time/count cell from the full count of the sample counter and a synchronized real time from the real time clock;

transmitting the heads up cell before transmitting each composed time frame;

transmitting the composed time frame; and transmitting the time/count cell between cell frames within an associated time frame, said transmitted heads up cells, composed time frames and time/count cells being collectively identified as an asynchronous data stream.

6. The method of claim 5 further comprising the step of receiving the asynchronous data stream.

7. The method of claim 6 further comprising the step of reconstructing digital data for each sensor from the received asynchronous data stream.

8. The method of claim 6 further comprising the step of performing an error check on the asynchronous data stream by ensuring that digital data was received from each sensor at each system clock time by using the partial count from the composed data cell.

* * * * *